United States Patent [19]

Isaka et al.

[11] Patent Number: 5,564,383
[45] Date of Patent: Oct. 15, 1996

[54] TUMBLE VALVE ARRANGEMENT FOR ENGINE

[75] Inventors: Yoshiharu Isaka; Takao Kawai, both of Iwata, Japan

[73] Assignee: Yamaha Hatsudoki Kabushiki Kaisha, Iwata, Japan

[21] Appl. No.: 298,132

[22] Filed: Aug. 30, 1994

[30] Foreign Application Priority Data

Sep. 6, 1993 [JP] Japan .................................. 5-245962
Apr. 21, 1994 [JP] Japan .................................. 6-106040

[51] Int. Cl.⁶ .............................. F02B 31/00; F01L 3/06; F02D 9/16
[52] U.S. Cl. .................................................. 123/306
[58] Field of Search ................................ 123/306, 429

[56] References Cited

U.S. PATENT DOCUMENTS

| | | | |
|---|---|---|---|
| 1,727,265 | 3/1929 | Aseltine | 123/184.39 |
| 3,318,292 | 5/1967 | Hideg | 123/308 |
| 3,408,992 | 11/1968 | Seggern et al. | 123/188.14 |
| 4,105,577 | 8/1978 | Yamashita | 252/300 |
| 4,174,686 | 11/1979 | Shimizu et al. | 123/308 |
| 4,228,772 | 10/1980 | Bakonyi | 123/403 |
| 4,240,387 | 12/1980 | Motosugi et al. | 123/308 |
| 4,256,062 | 3/1981 | Schafer | 123/308 |
| 4,269,153 | 5/1981 | Kunii et al. | 123/308 |
| 4,286,561 | 9/1981 | Tsutsumi | 123/432 |
| 4,308,830 | 1/1982 | Yamada et al. | 123/308 |
| 4,317,438 | 3/1982 | Yagi et al. | 123/432 |
| 4,320,725 | 3/1982 | Rychlik et al. | 123/306 |
| 4,413,598 | 11/1983 | Tsutsumi | 123/306 |
| 4,428,334 | 1/1984 | Klomp | 123/306 |
| 4,452,218 | 6/1984 | Yokoyama et al. | 123/579 |
| 4,499,868 | 2/1985 | Kanda et al. | 123/306 |
| 4,543,931 | 10/1985 | Hitomi et al. | 123/308 |
| 4,663,938 | 5/1987 | Colgate | 123/308 |
| 4,669,434 | 6/1987 | Okumura et al. | 123/308 |
| 4,700,669 | 10/1987 | Sakurai et al. | 123/308 |
| 4,714,063 | 12/1987 | Oda et al. | 123/308 |
| 4,719,886 | 1/1988 | Kotani et al. | 123/308 |
| 4,753,200 | 6/1988 | Kawamura et al. | 123/306 |
| 4,762,102 | 8/1988 | Kanda | 123/306 |
| 4,779,594 | 10/1988 | Oda et al. | 123/432 |
| 4,827,883 | 5/1989 | Khalighi et al. | 123/308 |
| 4,834,035 | 5/1989 | Shimada et al. | 123/308 |
| 4,930,468 | 6/1990 | Stockhausen | 123/308 |
| 4,974,566 | 12/1990 | LoRusso et al. | 123/308 |
| 4,995,359 | 2/1991 | Yokoyama et al. | 123/308 |
| 4,998,518 | 3/1989 | Mitsumoto | 123/306 |

FOREIGN PATENT DOCUMENTS

| | | |
|---|---|---|
| 0054964 | 6/1982 | European Pat. Off. . |
| 0068481 | 1/1983 | European Pat. Off. . |
| 0074202 | 3/1983 | European Pat. Off. . |
| 0076632 | 4/1983 | European Pat. Off. . |
| 0221312 | 5/1987 | European Pat. Off. . |
| 0235288 | 9/1987 | European Pat. Off. . |
| 449240 | 10/1991 | European Pat. Off. . |
| 0529676 | 3/1993 | European Pat. Off. . |
| 2569227 | 8/1986 | France . |
| 1292939 | 4/1969 | Germany . |
| 2709519 | 9/1977 | Germany . |
| 3429414 | 2/1985 | Germany . |
| 3638021 | 5/1987 | Germany . |
| 51-54007 | 12/1976 | Japan . |
| 56-43428 | 4/1981 | Japan . |
| 56-139829 | 10/1981 | Japan . |
| 59-5767 | 2/1984 | Japan . |
| 59-120718 | 7/1984 | Japan . |
| 60-11206 | 3/1985 | Japan . |
| 61-12940 | 1/1986 | Japan . |

(List continued on next page.)

*Primary Examiner*—David A. Okonsky
*Attorney, Agent, or Firm*—Knobbe, Martens, Olson & Bear

[57] ABSTRACT

A number of embodiments of single intake valve per cylinder engine wherein the induction passage is provided with a control valve for generating a tumble action in the intake passage when the engine is operating at speeds other than high speed high load. The arrangements are designed so as to promote a stratification in the combustion chamber under some running conditions and the intake passage is disposed at an angle to a plane containing the cylinder bore axis.

41 Claims, 14 Drawing Sheets

FOREIGN PATENT DOCUMENTS

| | | |
|---|---|---|
| 61-28715 | 2/1986 | Japan. |
| 61-25916 | 2/1986 | Japan. |
| 61-65064 | 4/1986 | Japan. |
| 61-144223 | 9/1986 | Japan. |
| 63-73532 | 2/1988 | Japan. |
| 63-32122 | 2/1988 | Japan. |
| 63-73534 | 5/1988 | Japan. |
| 2-115922 | 9/1990 | Japan. |
| 2-230920 | 9/1990 | Japan. |
| 60523 | 2/1948 | Netherlands. |
| 652671 | 5/1951 | United Kingdom. |
| 1135482 | 12/1968 | United Kingdom. |
| 1293772 | of 1972 | United Kingdom. |
| 1457152 | of 1976 | United Kingdom. |
| 2016081 | 9/1979 | United Kingdom. |
| 2027796 | 2/1980 | United Kingdom. |
| 2064646 | 6/1981 | United Kingdom. |
| 2079763 | 1/1982 | United Kingdom. |
| 2087480 | 5/1982 | United Kingdom. |
| 2107780 | 5/1983 | United Kingdom. |
| 2196388 | 4/1988 | United Kingdom. |
| 2196386 | 4/1988 | United Kingdom. |
| 2242226 | 9/1991 | United Kingdom. |
| 79/00501 | 8/1979 | WIPO. |
| 91/14858 | 10/1991 | WIPO. |

5,564,383

TUMBLE VALVE ARRANGEMENT FOR ENGINE

BACKGROUND OF THE INVENTION

This invention relates to a tumble valve arrangement for an engine, and more particularly to an improved tumble valve arrangement for an engine of the type having only a single intake valve for each of its combustion chambers.

The design of the induction system, like many other features in an internal combustion engine, represents a compromise of the optimum design for a given engine running and load condition. That is, where an engine is designed to operate over a wide variety of engine running conditions, certain components, such as the induction system, are designed to compromise the performance under certain conditions to try to improve the performance as much as possible throughout the entire engine speed and load ranges.

For example, an induction system that is efficient at low and mid-range speeds will provide too much restriction to the air flow under high-speed performance, and high-speed performance will deteriorate. That is, under low speed and low loads it is desirable to have the charge enter the combustion chamber at a relatively high velocity and also so as to generate turbulence in the combustion chamber. Under low speed, low load conditions, the turbulence is desirable as it improves flame propagation and will ensure complete combustion. On the other hand, a turbulence-inducing induction system will restrict the flow at high speeds and high loads, and hence can deteriorate high-speed performance.

Conventional induction systems, therefore, represent a compromise between optimum low speed and optimum high speed performance. The actual type of performance which is preferred will depend upon the application for the engine.

There has been proposed, however, induction systems that employ various devices wherein the induction system can have a wider range of performance improvement. For example, the use of control valves in the induction passage to alter its shape and/or effective cross-sectional area may be employed so as to permit performance increases across the entire engine speed and load ranges.

One type of turbulence-generating system and control valve which has been employed includes a control valve which directs the flow of the intake charge through the intake port in different directions depending upon the engine running condition. Under high-speed conditions, the control valve provides substantially no restriction to the intake charge, and the intake charge is delivered generally in an axial direction into the combustion chamber.

Under low speed, low load conditions, however, the intake charge is directed to flow primarily into the cylinder through one side of the intake port and generate a tumble action within the combustion chamber. Tumble is a type of swirl, but it occurs about an axis that extends transversely to the axis of the cylinder bore rather than around it. It has been found that tumble has a number of advantages. Specifically, the tumble action tends to become accelerated as the piston approaches top dead center, and thus may provide more efficient turbulence under low speed, low load conditions.

Normally these tumble control valves have been employed in engines having plural intake valves per cylinder. However, the advantages can also be employed in conjunction with engines having only a single intake valve per cylinder.

It is, therefore, a principal object of this invention to provide an improved induction system and tumble arrangement for an engine having only a single intake valve per cylinder.

It is a further object of this invention to provide an improved arrangement for introducing turbulence to an engine having only a single intake valve per cylinder wherein the induction passage and control valve are configured and arranged so as to provide the desired degree of motion in the combustion chamber when the control valve is in its turbulence-generating position.

There is a further advantage to the use of tumble, as opposed to swirl, as a turbulence-generating media. In some instances it is desirable to attempt to stratify the charge in the combustion chamber. By employing a stratified charge, the entire charge within the combustion chamber need not be stoichiometric in order for combustion to be initiated. However, where such a lean total charge is employed in the combustion chamber, it is necessary to ensure that a stoichiometric charge is present at the gap of the spark plug at the time it is fired.

With swirl, it may be difficult to ensure that the stoichiometric charge is kept present at the spark gap at the time of spark firing unless precombustion or torch chambers are employed. With tumble, on the other hand, it is possible to provide a rich fuel-air mixture on one side of a plane containing the cylinder bore axis and on which the spark plug lies while the other side of the plane may be substantially leaner. Since the tumble motion occurs about an axis transverse to the cylinder bore axis, the tumble action will not cause the same degree of mixing in the combustion chamber as occurs with swirl.

It is, therefore, a still further object of this invention to provide an improved tumble arrangement for an internal combustion engine wherein the stratified charge may be obtained and maintained.

It is a further object of this invention to provide an improved induction system arrangement for an internal combustion engine using only a single intake valve wherein a stratified charge may be obtained and maintained throughout the stroke of the piston and around the spark gap at the time of firing.

SUMMARY OF THE INVENTION

The various features of this invention are adapted to be embodied in a cylinder head for use with a cylinder block having a cylinder bore and which is closed by the cylinder head. The cylinder head has a surface cooperable with the cylinder bore and a piston reciprocating therein to form a combustion chamber. A single valve seat is formed in the cylinder head surface at the termination of an intake passage for delivering an intake charge to the combustion chamber through the single valve seat. A control valve is positioned in the intake passage and is movable between an open position wherein the charge flows into the combustion chamber without substantial restriction and a closed position wherein the flow from the intake passage into the combustion chamber from the valve seat is in a tumble motion rotating about an axis that extends transversely to the axis of the cylinder bore. The intake passage is inclined at an angle to a plane containing the axis of the cylinder bore so that the flow through the valve seat is disposed at an angle to the plane.

DETAILED DESCRIPTION OF THE PREFERRED EMBODIMENTS OF THE INVENTION

Figure 1:
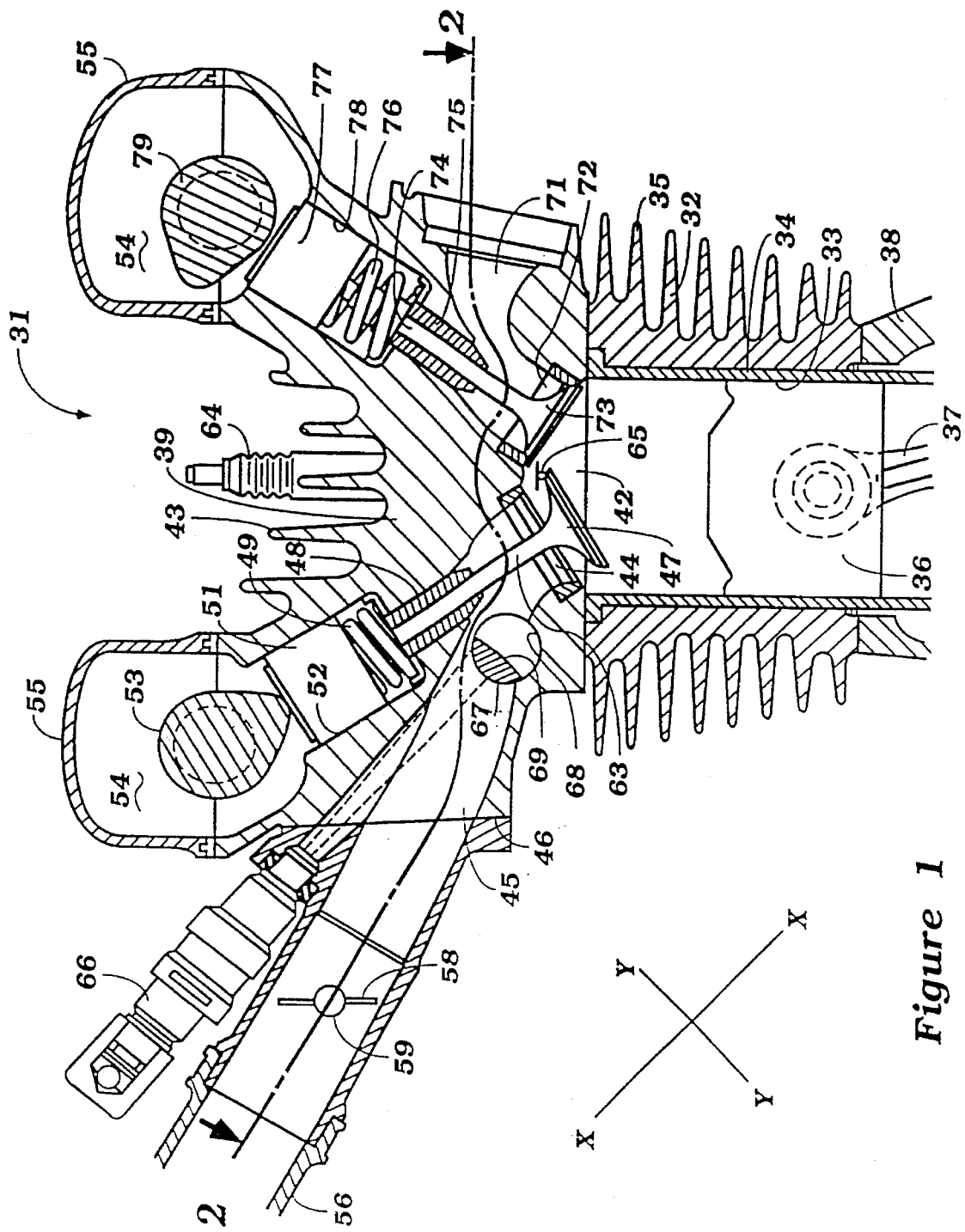
FIG. 1 is a partial cross-sectional view taken through a single cylinder of a multiple-cylinder internal combustion engine constructed in accordance with an embodiment of the invention.

Referring now in detail to the first embodiment of FIGS. 1–10, an internal combustion engine constructed in accordance with this embodiment is shown partially and is identified generally by the reference numeral 31. Basically, the engine 31 will be depicted by description to a single cylinder of the engine. It will be readily apparent to those skilled in the art how the invention can be applied to multiple cylinder engines and engines having any type of cylinder configuration, such as in-line, V-type, opposed, etc.

In the illustrated embodiment, the engine 31 is depicted as being employed for application in a motorcycle or similar vehicle, and the engine 31 is mounted in the vehicle so that it will be inclined to be horizontal and vertical, as indicated by the planes XX and YY, respectively, in FIG. 1. The engine 31 has been tilted into an upright position in certain of the drawings so as to more clearly show the construction and so that the reader can easily orient himself with respect to the engine. Although the invention is described in conjunction with such an application, it will be readily apparent to those skilled in the art that the invention can be employed with engines utilized for other purposes. However, the invention has particular utility in conjunction with engines that are employed to power motor vehicles because of the fact that the induction system, to be described, provides good performance over a wide range of engine loads and speeds.

The engine 31 includes a cylinder block 32 in which one or more cylinder bores 33 are formed by pressed or cast-in liners 34. In the illustrated embodiment, the engine 31 is air cooled, and for this purpose the cylinder block 32 is provided with cooling fins 35. As should be readily apparent to those skilled in the art, however, the invention may also be employed in conjunction with water-cooled engines or engines that are partially air cooled and partially water cooled.

Pistons 36 reciprocate in each of the cylinder bores 33 and are connected by means of connecting rods 37 to a crankshaft (not shown). The crankshaft is rotatably journaled within a crankcase chamber formed by a crankcase member 38 that is affixed to the cylinder block 32 in a known manner. Since the invention deals primarily with the cylinder head and induction system arrangement for the engine 31, the crankcase, crankshaft, and output elements are not shown. Where any components of the engine 31 are not depicted or described, they may be considered to be conventional.

A cylinder head, indicated generally by the reference numeral 39, is affixed to the cylinder block 32 in a well-known manner as by means of a plurality of head bolts 41 (FIG. 2) that are disposed at equally spaced distances around the cylinder bore 33. The lower surface of the cylinder head 39 is provided with individual recesses 42, which are in closing relationship with the cylinder bores 33 and define with the cylinder bores 33 and the heads of the pistons 36 the combustion chambers. The volume of these combustion chambers vary cyclically as the piston 36 reciprocates in the cylinder bore 33, as is well-known in this art. At times the recesses 42 will themselves be referred to as the combustion chambers, since at top dead center position, the recesses 42 describe primarily the volume of the combustion chamber.

The cylinder head 39, like the cylinder block 32, is formed with cooling fins 43. As has already been noted, however, the engine 31 may be all or partially water cooled.

Formed in the cylinder head recess 42 at one side thereof is an intake valve seat 44 which is formed at the end of an intake passage 45 that extends from one side surface 46 of the cylinder head 39 and which terminates at the valve seat 44. The valve seat 44 may be formed by a pressed or cast-in insert.

A poppet-type intake valve, indicated generally by the reference numeral 47, has a stem portion that is slidably supported for reciprocation about an axis defined by a valve guide 48 that is pressed or cast into the cylinder head 39 in a known manner. A coil compression spring 49 engages the cylinder head 39 and a keeper retainer assembly that is affixed to the valve stem of the intake valve 47 for urging it to its closed position. A thimble tappet 51 is slidably supported within a bore 52 of the cylinder head 39 and is associated with this keeper retainer assembly through an adjustable shim (not shown). An intake camshaft 53 is journaled within the cylinder head assembly 39 in a well-known manner for operating the thimble tappet 51 and the intake valve 47. This mechanism is contained within a cam chamber 54 that is closed by a cam cover 55 in a known manner.

The induction passage 45 of the cylinder head and the induction system which serves it, now to be described, are configured in such a way so as to provide a desired flow of intake charge into the combustion chamber 42. The induction system includes a remotely positioned air inlet device (not shown) that has an individual runner 56 that extends to and communicates with a throttle body 57 which is interposed between the induction system runner 56 and the surface 46 of the cylinder head 39. A manually operated throttle valve 58 is positioned in the throttle body 57 and is fixed on a throttle shaft 59 for controlling the flow through the induction system in response to the input from the vehicle operator. It should be noted that the runner 56 and throttle body 57 define an intake passage which is generally cylindrical in shape and which in this embodiment has a central axis 61 that extends generally perpendicularly to a plane containing the axis of the cylinder bore 33 and either parallel to or containing the axis of the crankshaft of the engine. This axis is also parallel to the axis of the intake camshaft 53.

Figure 2:
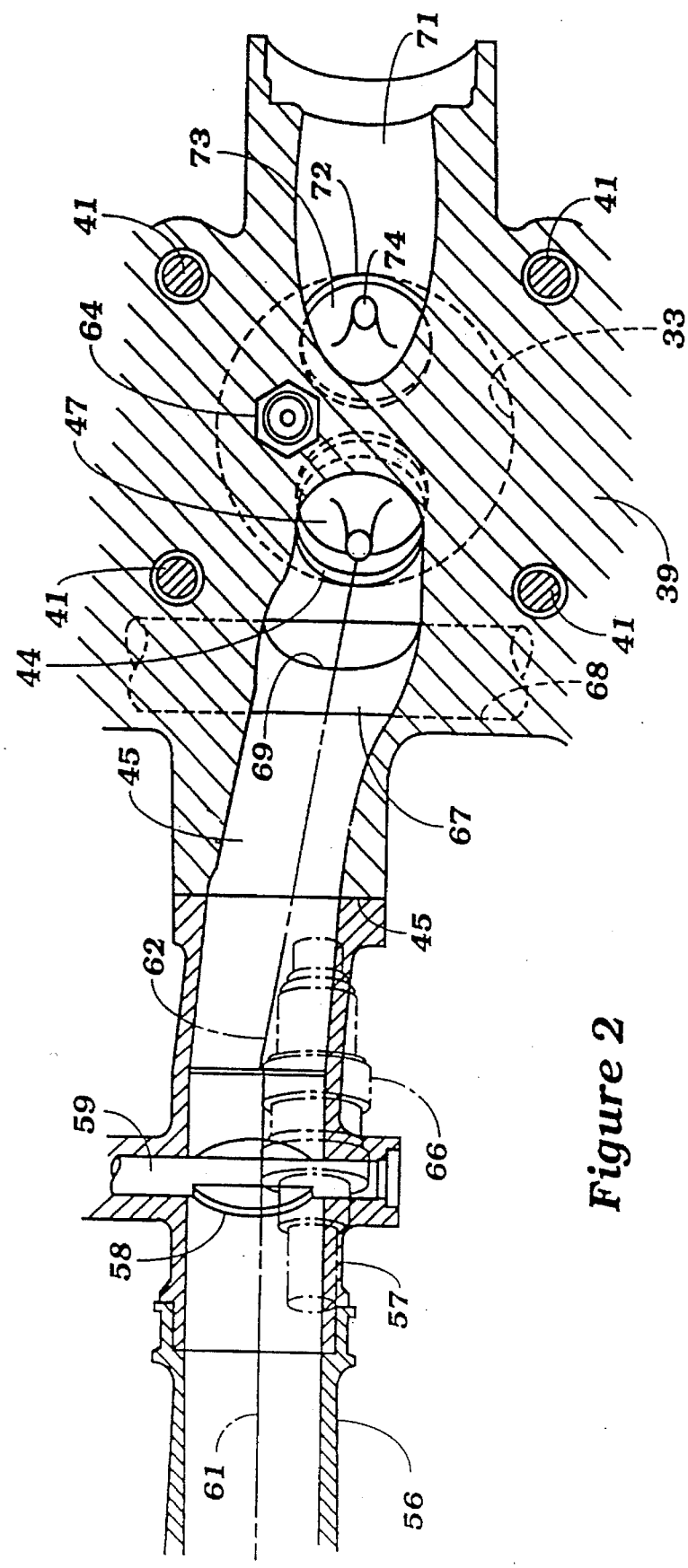
FIG. 2 is a cross-sectional view taken along the line 2—2 of FIG. 1.
Figure 3:
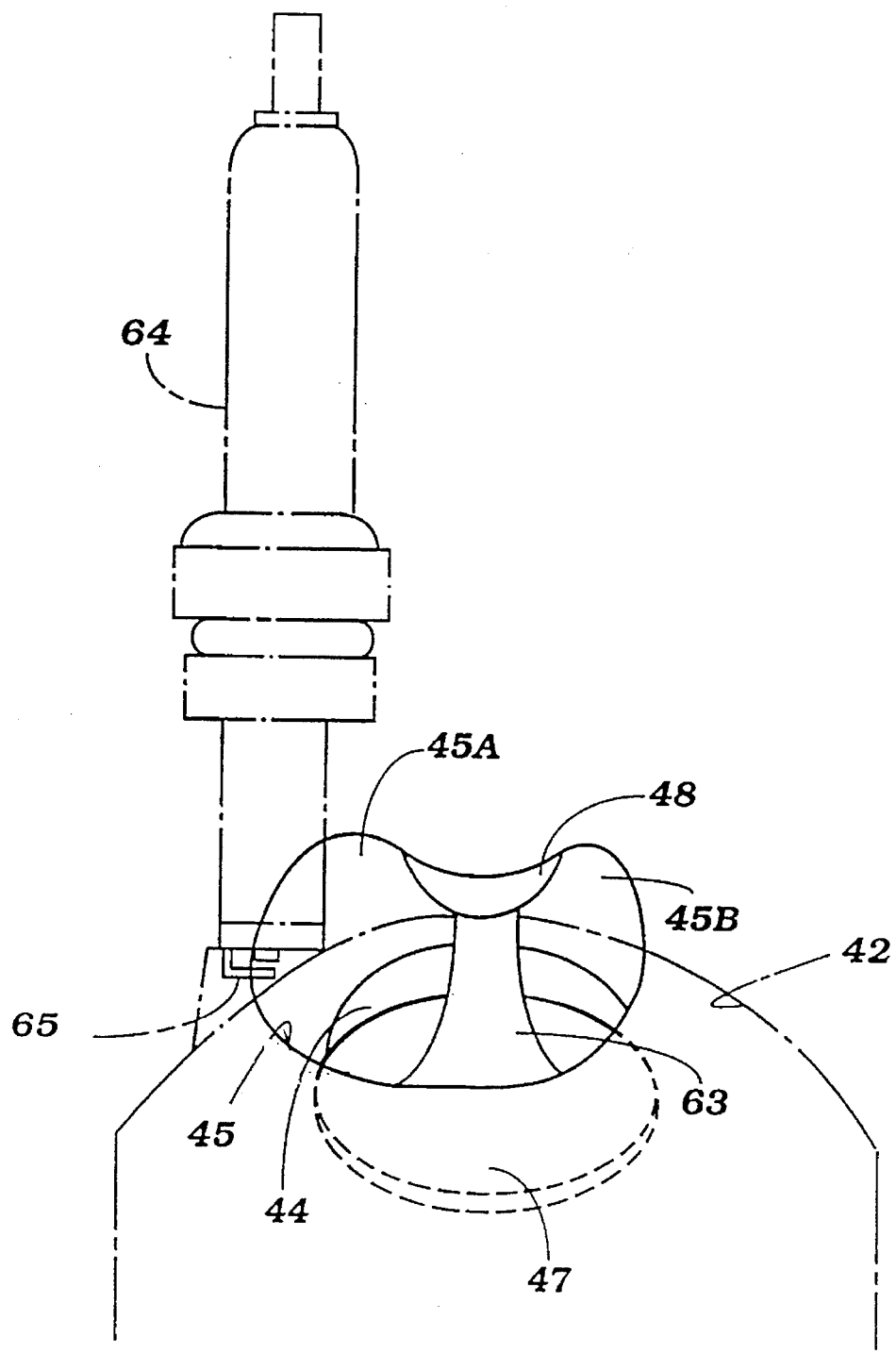
FIG. 3 is a partial phantom view looking in the direction of the intake passage and with the control valve in its fully opened position.

The downstream side of the throttle body, however, and the inlet portion of the cylinder head intake passage 45 are inclined at an acute angle to this plane, as indicated at 62 in FIG. 2, so as to turn the direction of the charge flowing into the combustion chamber 42 in a direction toward one side of the intake valve 47. However, the intake passage 45 in the cylinder head 39 is configured, as shown in FIG. 3, so that the intake passage 45 is divided into a first portion 45*a* on one side of the stem of the intake valve 47 and a smaller cross-sectional area portion 45*b* disposed on the other side of the valve stem, which is identified at 63 in FIG. 3. Hence, the intake passage 45 is offset to one side of the intake valve seat 44, as clearly shown in this figure.

In accordance with an embodiment of the invention, a spark plug 64 is mounted in the cylinder head 39 with its spark gap 65 lying on this larger side of the intake passage 45. As a result, although the flow direction is somewhat headed in the opposite direction, there will be a larger air flow into the combustion chamber on the side of the intake valve seat 44 closer to the spark plug gap 65 than on the opposite side.

Figure 4:
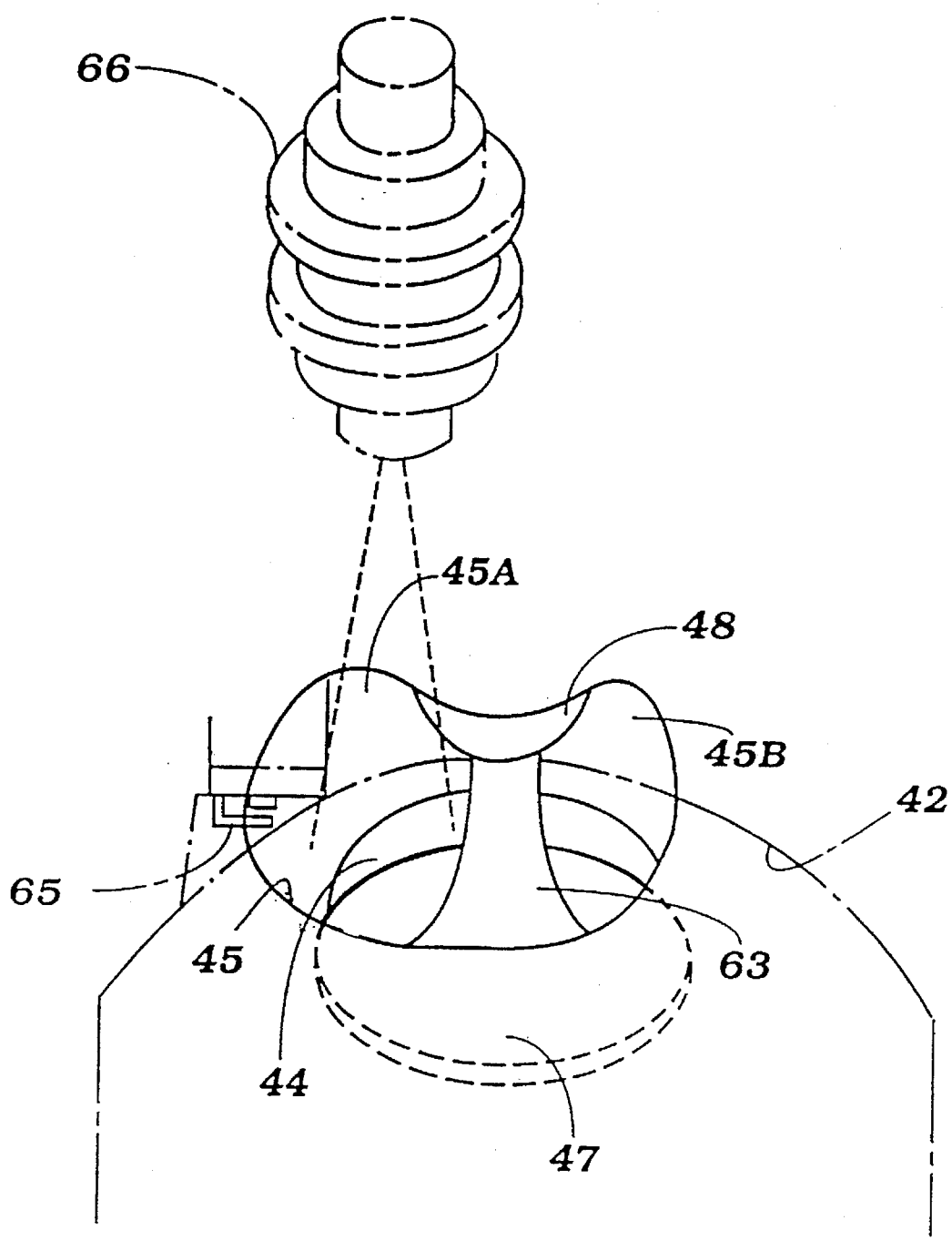
FIG. 4 is a view, in part similar to FIG. 3, and shows the fuel injector and spray pattern, also in phantom.

A fuel injector 66 is mounted in the throttle body 57 on one side of the axis 61, but is disposed so that its spray axis will intersect the center 62 of the cylinder head intake passage 45 and be directed toward the larger side 45*a* of the induction passage 45, as clearly shown in FIG. 4. As a result, when the fuel injector 66 injects and during the intake cycle when the intake valve 47 is opened, a richer fuel-air mixture will be disposed on the side adjacent the spark plug 66 than on the opposite side so as to achieve some stratification.

Generally, the induction system, including the cylinder head intake passage 45 as thus far described, is designed primarily so that the charge which enters the combustion chamber 42 will flow in a generally unrestricted fashion. Such an arrangement is particularly useful in order to obtain high specific outputs and good volumetric efficiency. However, under low engine speeds and low loads, such large and low restriction induction passages tend to have a sluggish air flow into the cylinder, and poor fuel vaporization and combustion process can occur.

Therefore, in accordance with an important feature of the invention, a control valve assembly, indicated generally by the reference numeral 67, is provided in the cylinder head 39 and is rotatably journaled within a bore 68 formed in the cylinder head, which extends transversely to the aforenoted plane containing the axis of the cylinder bore. It should be noted that the bore 68 is disposed between the axis of the cylinder bore 33 and the axis of rotation of the intake camshaft 53, and is disposed outwardly of the head bolt 41 on the intake side of the engine.

Basically, the control valve 67 is formed at a circular section which is provided with a cutout 69, which, in the fully opened position, has a surface that is substantially coincident with the cylinder head surface that forms the induction passage 45 so as to provide no significant flow restriction in the fully opened position, which position is shown in FIGS. 3, 4, 5, 7, and 8.

Figure 10:
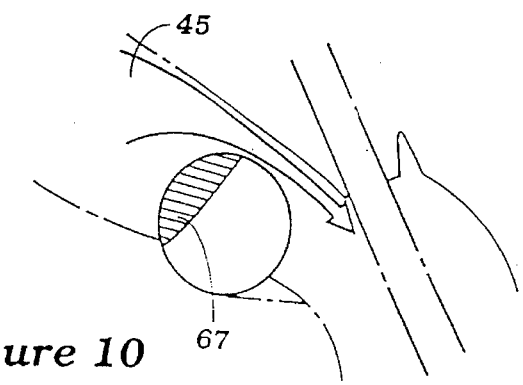
FIG. 10 is a cross-sectional view, taken along the line 10—10 and in part similar to FIG. 8, but shows the control valve in its closed position.

However, when rotated in a clockwise direction, as seen in FIGS. 1, 2, 6, 9, and 10, the body of the valve 67 will protrude into the induction passage 45 and redirect the air flow therethrough toward the upper portion thereof so as to flow through the portion of the intake valve seat 44 disposed closest to the cylinder bore axis and in a direction as indicated by the arrow in FIG. 10 so as to generate a swirling or tumbling action within the cylinder bore about an axis that extends transverse to the axis of the cylinder bore 33. This tumble action will continue to be maintained as the piston 36 approaches top dead center and will, in fact, accelerate as the volume of the combustion chamber 42 is decreased so as to further increase the tumble and swirl under this condition. Hence, the charge will be quite turbulent, and there will be rapid flame propagation. Also, since the charge is stratified more toward the side of the spark plug 64 and specifically at the spark gap 65, when the spark plug 64 is fired, this charge will be stoichiometric and will burn rapidly and completely.

Figure 5:
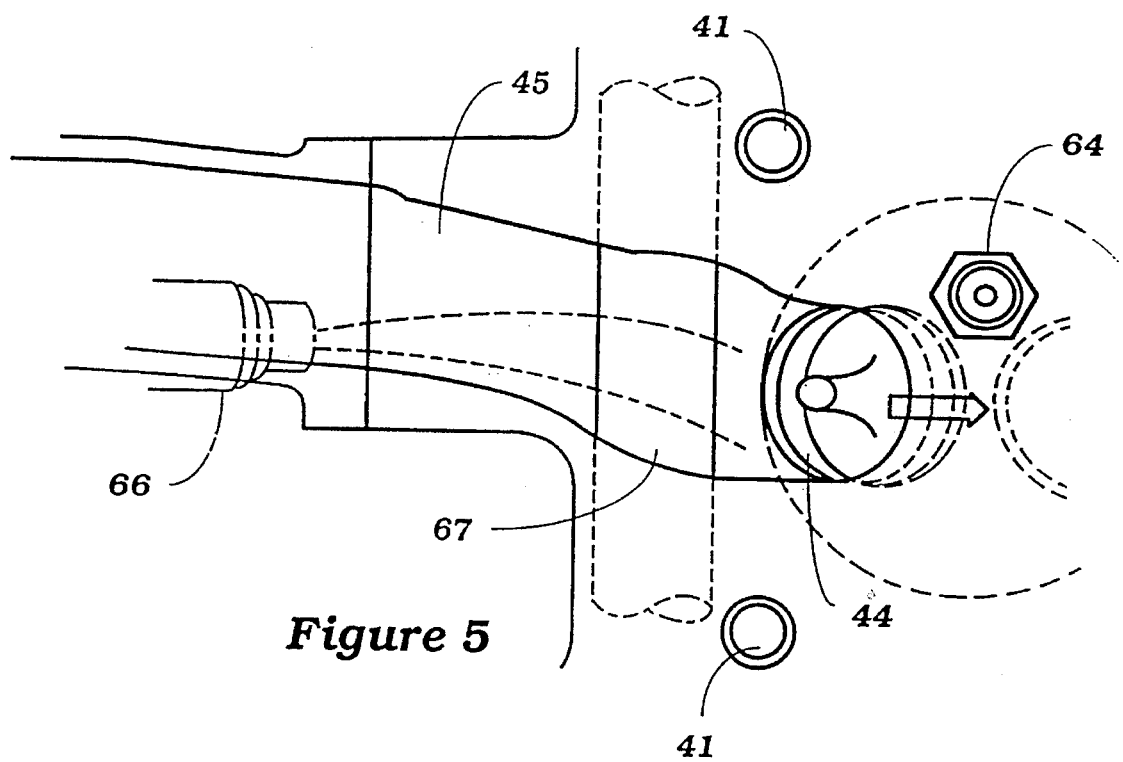
FIG. 5 is a top plan view, in part similar to FIG. 2, and shows the flow when the control valve is in its opened position.
Figure 6:
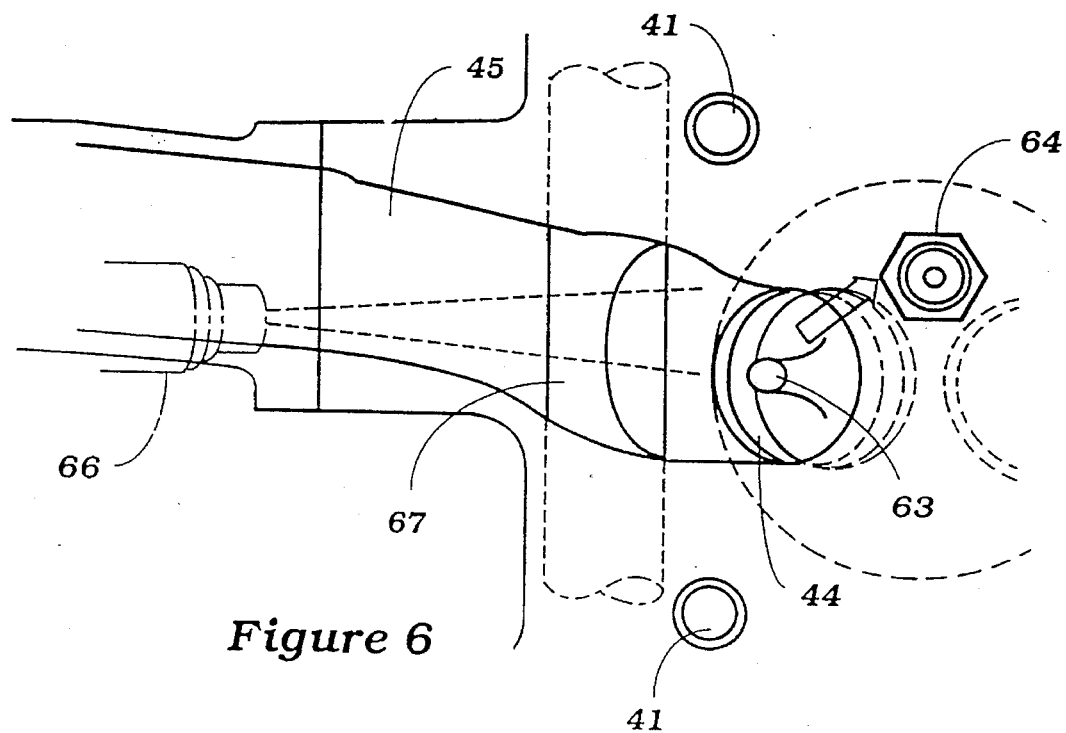
FIG. 6 is a view, in part similar to FIG. 5, and shows the flow when the control valve is in its closed position.
Figure 7:
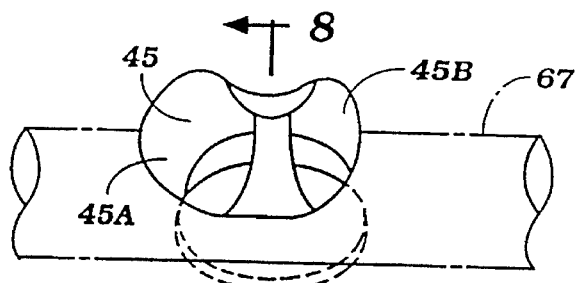
FIG. 7 is a view, in part similar to FIG. 3, and shows the control valve in its open position.
Figure 8:
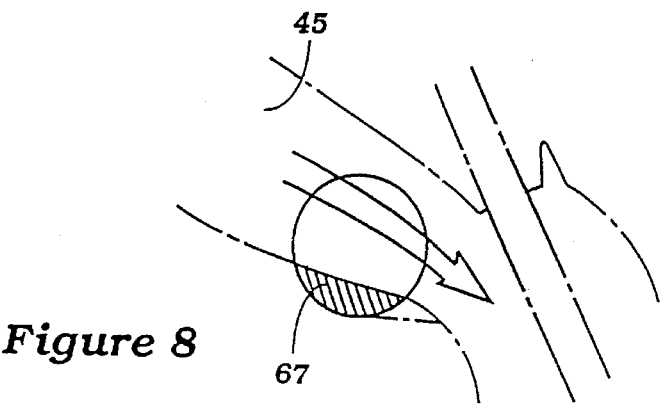
FIG. 8 is a cross-sectional view, taken along the line 8—8 of FIG. 7.
Figure 9:
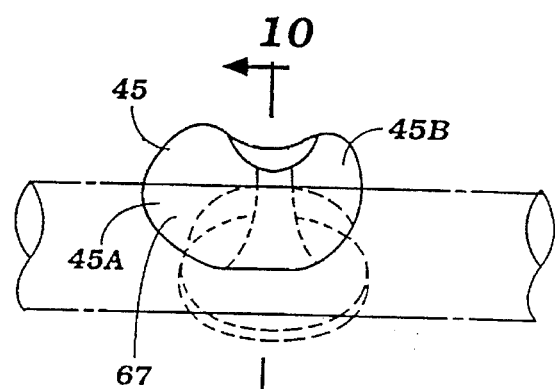
FIG. 9 is a view, in part similar to FIG. 7, but shows the control valve in its closed position.

As may be seen in FIG. 5, when the control valve 67 is in its fully opened position, the air flow through the induction passage 45 will tend to sweep the fuel spray from the fuel injector 66 more toward the center of the intake valve seat 44 so as to provide more homogeneous mixture in the combustion chamber. However, when the control valve 67 is in its closed position, as shown in FIG. 6, the flow Volume will be reduced and the injector penetration will be greater, since there will be a somewhat lower volume of air flow, albeit at a somewhat higher speed than if the control valve 67 were not closed. Thus the fuel spray will be directed toward one side of the stem 63 of the intake valve, and specifically the spark plug side thereof, so as to provide the aforenoted stratification.

Referring again primarily to FIGS. 1 and 2, an exhaust passage 71 is formed on the side of the cylinder head 39 opposite the intake passage 45 and extends from the combustion chamber recess 42 through an intake valve seat 72 communicates at its discharge end with an exhaust manifold (not shown) and exhaust system for the discharge of exhaust gases to the atmosphere. A poppet-type exhaust valve 73 has a stem portion 74 that is slidably supported in an exhaust valve guide 75 that is affixed in a suitable manner to the cylinder head 39, as by being pressed or cast in. The exhaust valve 73 is urged to its closed position by means of a coil compression spring 76 that is engaged by a keeper retainer assembly (not shown) affixed to the upper end of the valve stem 74 and which bears against the cylinder head at its lower end. A tappet 77 is slidably supported in a bore 78 formed in the cylinder head 39. An exhaust camshaft 79 is also journaled in the cam chamber 54 and is driven by means of a drive along with the intake camshaft 53 at one-half crankshaft speed, as is well known in this art. The exhaust camshaft 79 serves to open the exhaust valve 73 and permit the exhaust gases to discharge from the combustion chamber in a well-known manner.

Figure 11:
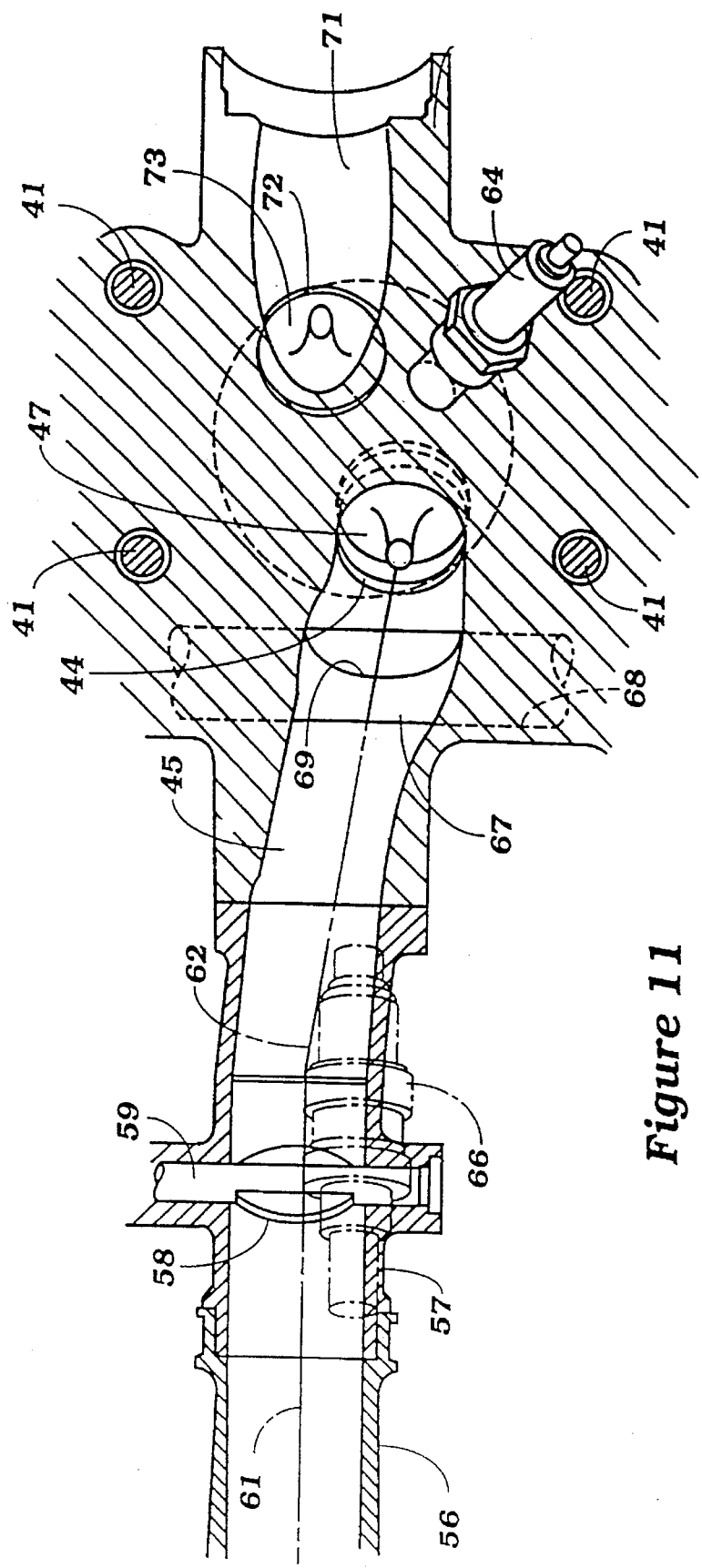
FIG. 11 is a cross-sectional view, in part similar to FIG. 2, and shows another embodiment of the invention.

In the embodiment of the invention as thus far described, the offset or angled center 62 of the throttle body 57 and cylinder head intake passage 45 has been directed away from the spark plug 64, and specifically at spark gap 65, even though the larger portion of the intake passage 45 is disposed on the side adjacent the spark plug 64 and the spark gap 65. In addition, the center of the intake valve stem 47 and of the exhaust valve stem 74 have been placed on a plane that is perpendicular to this plane and which also contains the cylinder bore axis. Of course, other relationships are possible, and FIG. 11 shows such an arrangement which is generally the same as that previously described, except as will be noted. Since all components of this embodiment are the same except for their orientations, the same reference numerals have been used to designate components which are the same but which may be placed differently.

In this embodiment, the spark plug 64 is disposed on the side of the aforenoted plane opposite that shown in FIG. 2, and the intake valve seat 44 is also shifted toward this side, as clearly shown in FIG. 11. Hence, the flow direction of the flow axis 62 of the cylinder head intake passage 45 will be directed at the gap of the spark plug 64, and the larger surface area of the intake passage 45 will be disposed toward the axis of the cylinder bore but still on the same side of the cylinder bore axis as the spark plug 64. Other than that, this embodiment operates and is constructed the same as that previously described.

Figure 12:
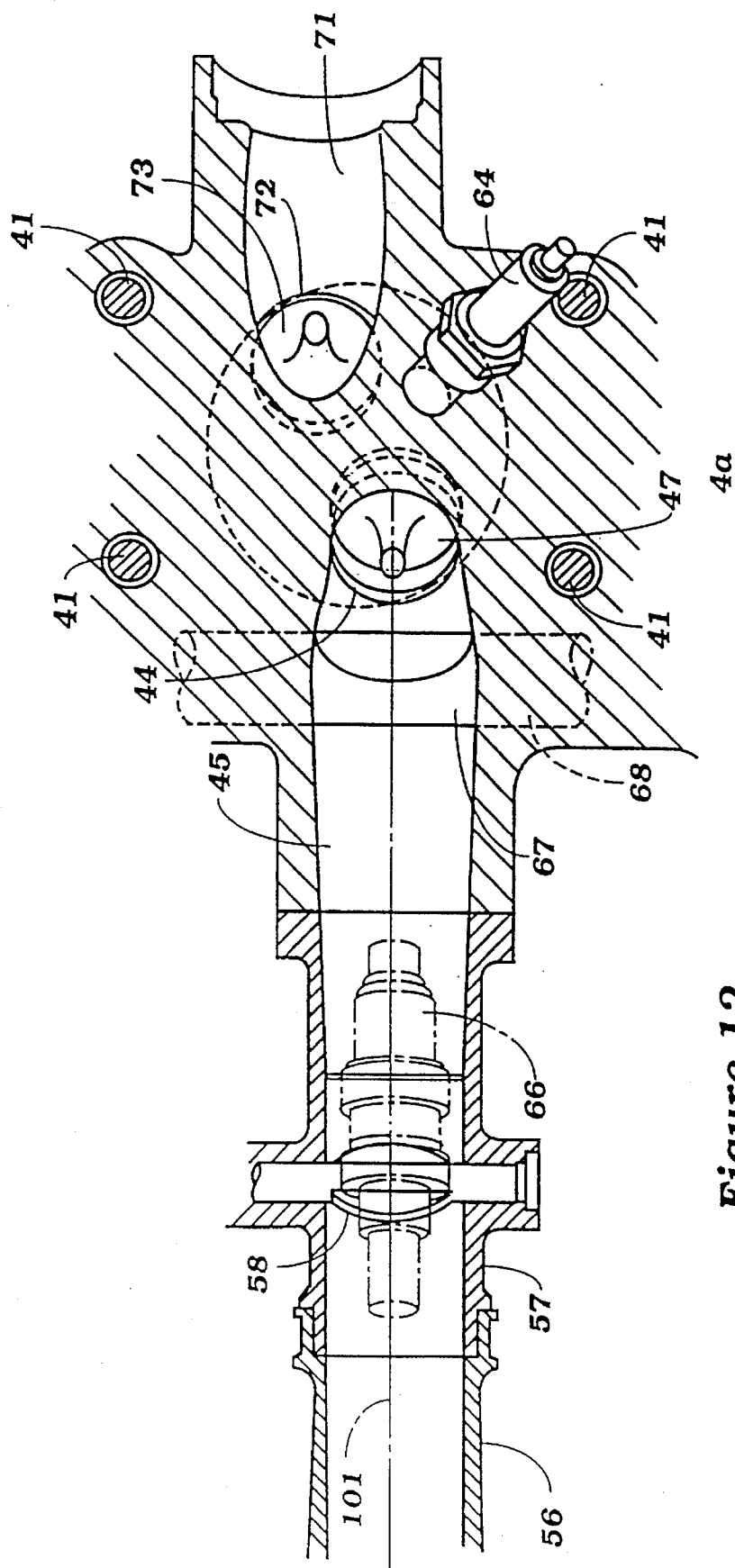
FIG. 12 is a cross-sectional view, in part similar to FIGS. 2 and 11, and shows a further embodiment of the invention.
Figure 13:
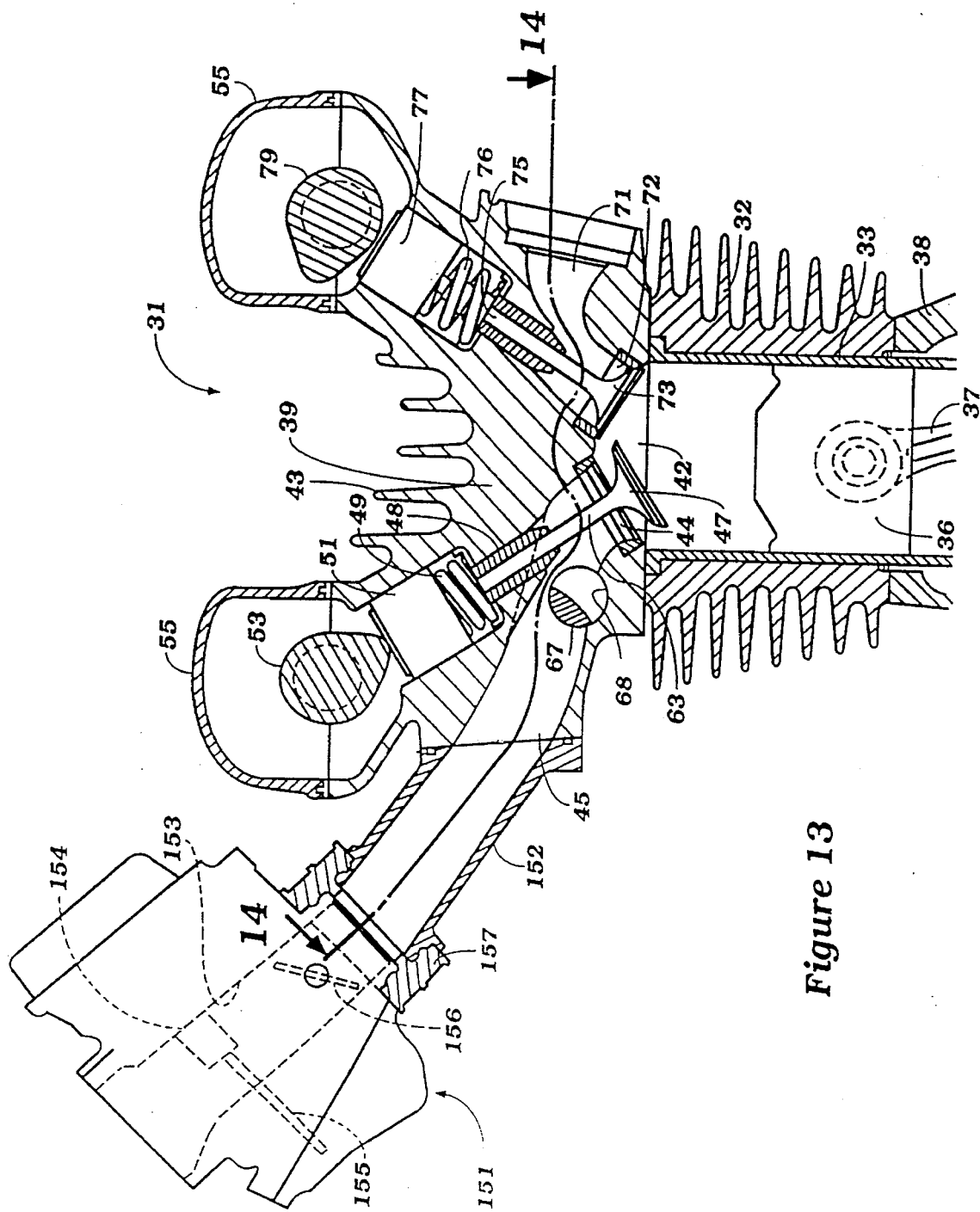
FIG. 13 is a cross-sectional view, in part similar to FIG. 1, and shows yet a further embodiment of the invention.

FIG. 12 is another embodiment, in part similar to that of FIGS. 1–10 and 11, and differs from those embodiments previously described in only the orientation of the components and not in their basic construction. In this embodiment, the intake valve seat 44 is located offset, as in the embodiment of FIG. 11, and the spark plug 64 is also placed on this offset side of the cylinder bore axis. However, in this embodiment the intake passage centerline, indicated generally by the reference numeral 101, is completely in line from the induction device 56 through the throttle body 57 and cylinder head intake passage 45, and passes through the center of the intake valve seat 44. As a result, the fuel injector 66 is also disposed so as to be on this same centerline. Hence, this arrangement does not achieve quite as much stratification as with the previously described embodiment, but will nevertheless achieve some stratification because the intake valve seat 44 and spark plug 64 are offset to the same side of the cylinder bore axis.

In the embodiments thus far described, fuel injection has been employed and this has been manifold injection. The invention may also be employed with direct cylinder fuel injection or with carburetion although that later form of application does not lend itself quite as much to stratification as with fuel injection either direct or manifold. FIGS. 13–16 show an embodiment of the invention which is generally similar to those which have been previously described and, for that reason, components of this embodiment which are the same as the previously-described embodiment have been identified by the same reference numerals. In this embodiment, certain of the geometric relationships are different, and it is to be understood that those different relationships may also be employed, as will be described, in conjunction with fuel injected engines. In addition, this embodiment shows an arrangement wherein a squish area may also be employed so as to further achieve the stratification and augment the turbulent flow. This squish action can be also used with the embodiments as thus far described and also with those which will be described later.

Figure 14:
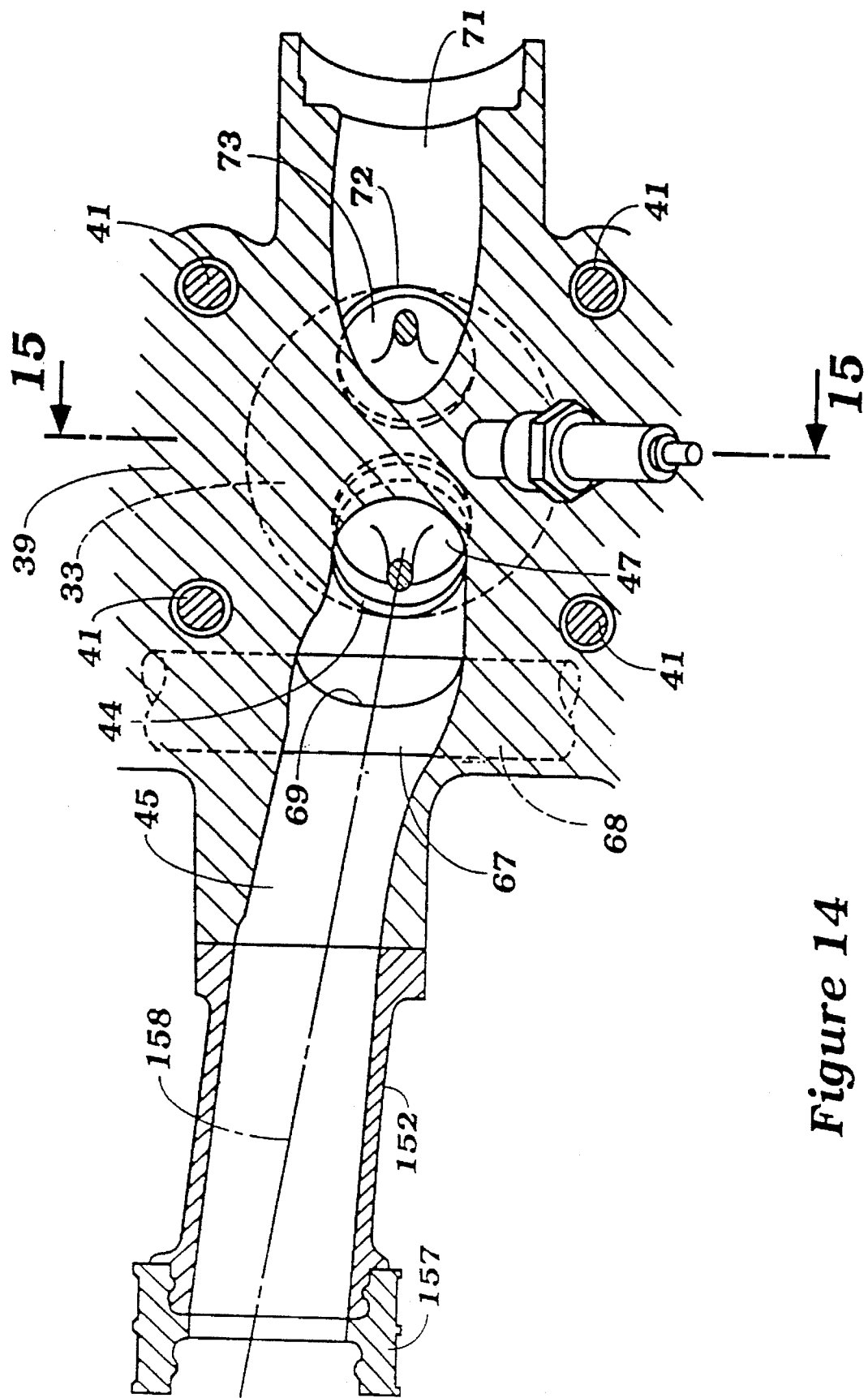
FIG. 14 is a cross-sectional view taken along the line 14—14 of FIG. 13 and is in part similar to FIGS. 2, 11, and 12.

In this embodiment, the basic structure of the cylinder head is as previously described, however, this embodiment shows an arrangement like the embodiment in construction of FIGS. 1–10 but the spark plug is disposed on the side of the cylinder head opposite that shown in FIGS. 1–10 as clearly shown in FIG. 14. However, the arrangement is still such that there will be stratification achieved particularly when the tumble action occurs that will direct the rich fuel/air mixture to the gap 65 of the spark plug 64.

With this embodiment, however, a charge former in the form of an air valve carburetor, indicated generally by the reference numeral 151 serves the cylinder head intake passage 45 through an intake manifold 152. The carburetor 151 has an induction passage 153 that receives atmospheric air from an air inlet which can include an air silencer and air filter (not shown). A sliding piston valve 154 cooperates with the induction passage 153 so as to provide a constant pressure drop thereacross and carries a metering rod 155 that cooperates with a main metering jet (not shown) for controlling the fuel flow in response to the position of the sliding piston 154 and the effective cross-sectional area of the induction passage 153.

A manually operated throttle valve 156 positioned in the induction passage 153 downstream of the sliding piston 154.

The carburetor 151 is connected to the manifold 152 by an insulating spacer 157.

As may be seen in FIG. 14, the manifold 152 and cylinder head intake passage 45 have an offset centerline, indicated generally by the reference numeral 158 which is offset in the same direction as that shown in FIGS. 1–10. As has been noted, however, the spark plug 64 in this embodiment is offset to the side of the perpendicular plane containing the cylinder bore axis toward which the center 158 is directed. Hence, some form of fuel stratification will be achieved although, as noted, not quite as effective as that of the fuel injected embodiment.

Figure 15:
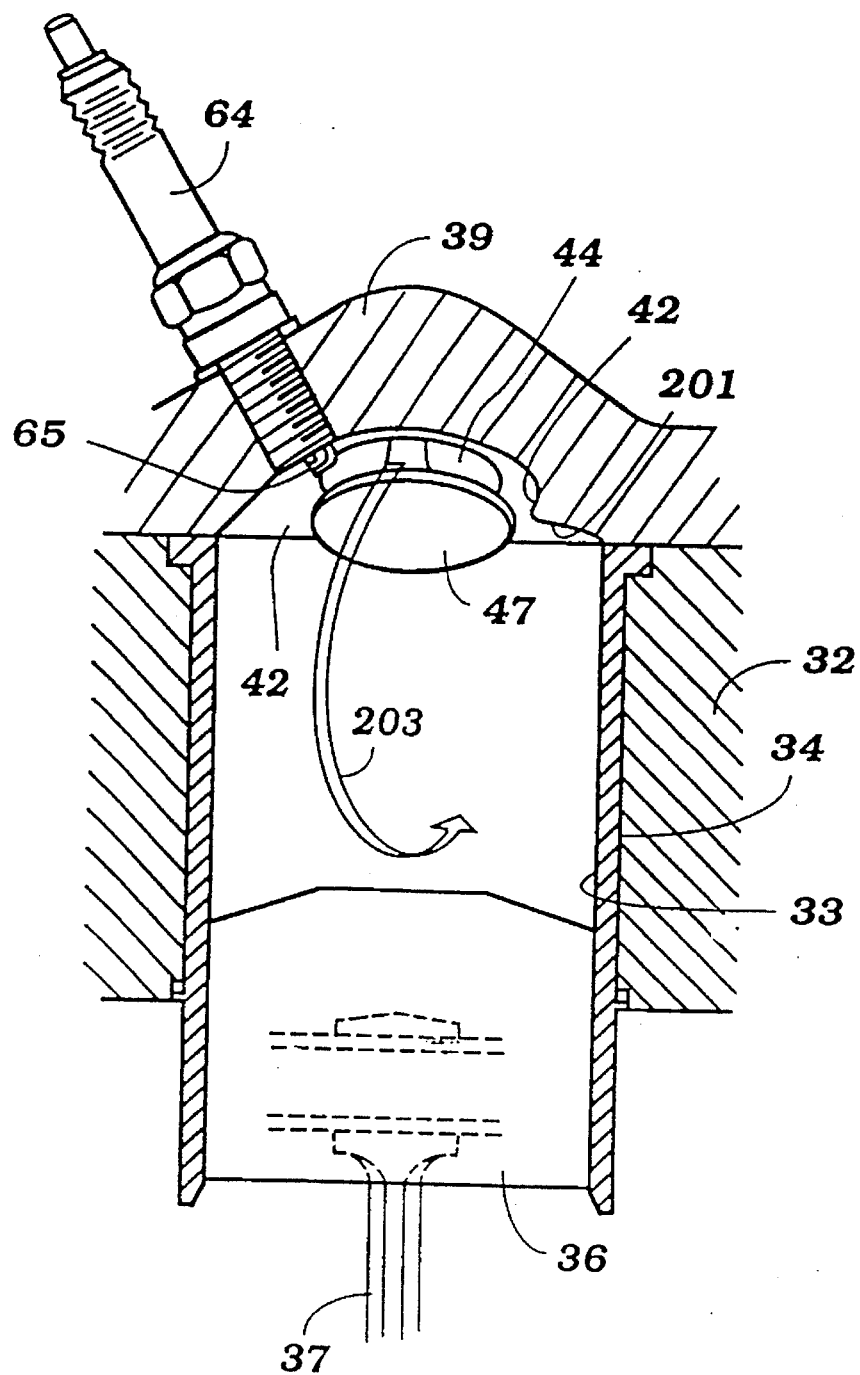
FIG. 15 is a cross-sectional view taken along the line 15—15 of FIG. 14 and shows the direction of charge flow into the combustion chamber when operating in the tumble-generating condition.
Figure 16:
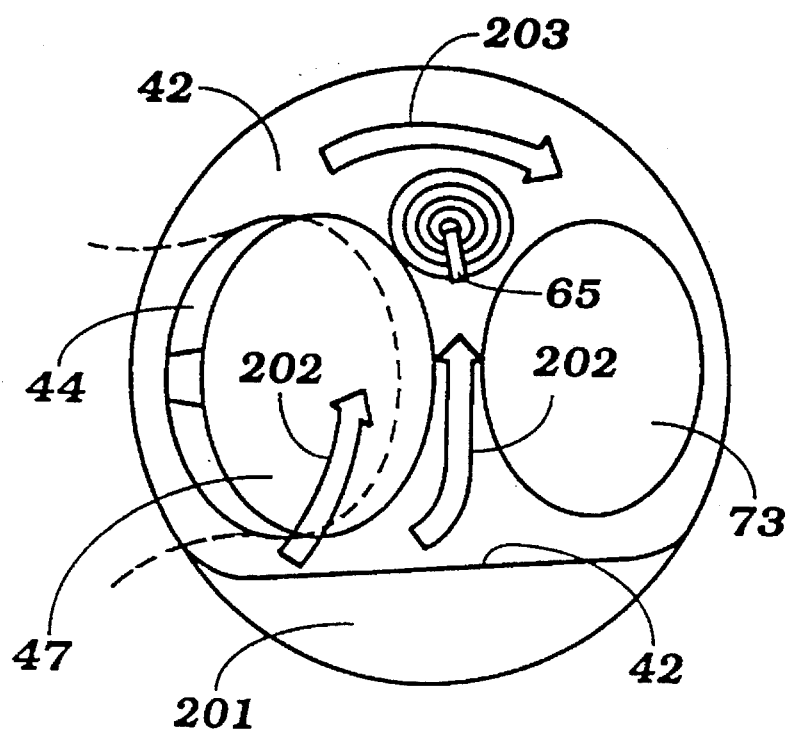
FIG. 16 is a bottom plan view of the cylinder head of this embodiment and shows how the squish area acts to further assist in the tumble action.

However, the structure for improving stratification best shown in FIGS. 15 and 16 does provide good stratification even with a carburetor engine. In accordance with this arrangement, the cylinder head recess 42 has a flattened squish area 201 formed at one side thereof and this is the side away from which the intake charge is directed. As a result, when the piston moves to its top dead center position, a squish action will be achieved as shown by the arrows in FIG. 16 which arrows are indicated by the reference numerals 202 which cooperate with the offset tumble action caused by the flow in the direction of the arrow 203 so as to further direct the intake charge toward the spark gap 65 so as to improve the stratification effect.

In the embodiments of the invention as thus far described, the cutout 69 of the control valve 67 has been generally symmetrically disposed relative to the portion of the intake passage 45 across which it extends. It may be possible, however, to configure this cutout so as to achieve different types of flow patterns, particularly when operating in the tumble inducing position. Next will be described a number of embodiments showing varying configurations for the control valve. Because this is the only difference from the previously-described embodiments and since these constructions may be utilized in conjunction with any of the valve placements, charge forming systems and intake passages as previously described, only the control valve and its relationship with the intake passage and intake valve have been depicted in these figures. Where components are the same as those previously described, they have been identified by the same reference numerals.

Figure 17:
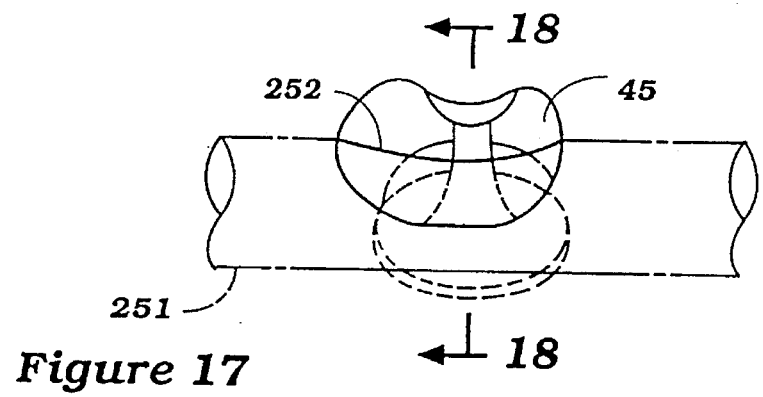
FIG. 17 is a view, in part similar to FIG. 7, and shows another configuration of control valve arrangement which may be utilized, with the control valve being depicted in its closed tumble-inducing position.
Figure 18:
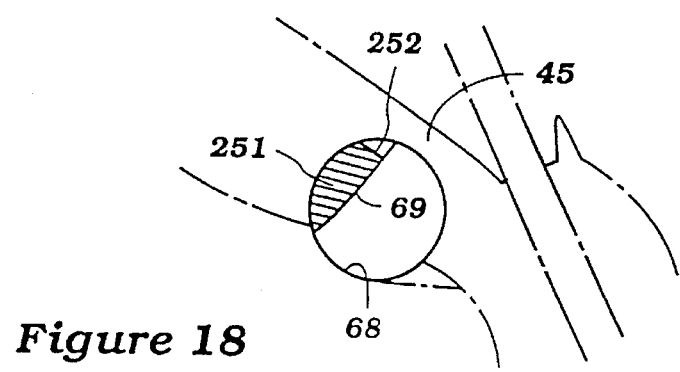
FIG. 18 is a cross-sectional view taken along the line 18—18 of FIG. 17.
Figure 19:
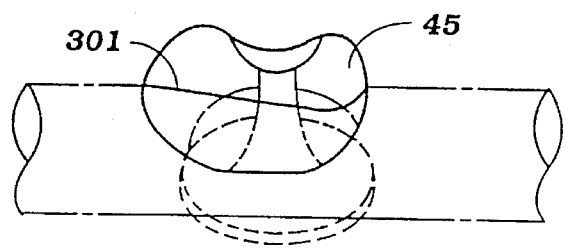
FIG. 19 is a view, in part similar to FIG. 17, and shows a further embodiment of the invention.

The first of these embodiments is shown in FIGS. 17 and 18 and the control valve is identified generally by the reference numeral 251 and has for the most part a cylindrical configuration that is received in the bore 68 of the cylinder head. In this embodiment, however, there is provided not only the cutout 69 as with the previously described embodiments but also a further notch 252 which may be asymmetrically disposed so as to provide a somewhat greater flow area than with the previously described embodiment and also to configure the flow area toward one side or the other of the intake passage 45. For example, this cutout may be configured as shown at 301 in FIG. 19 so as to direct more flow toward the right side than the left side.

Figure 20:
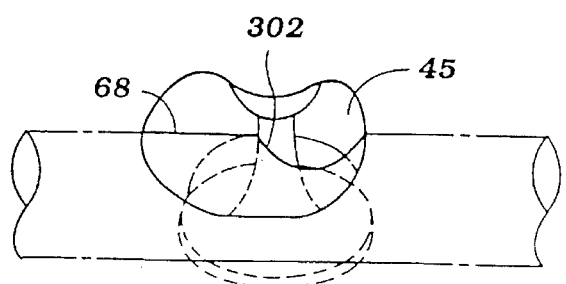
FIG. 20 is a view, in part similar to FIGS. 17 and 19, and shows a still further embodiment of the invention.

An even more restricted cutout is shown at 302 in FIG. 20 wherein substantially more flow is permitted on the right-hand side and there is very little transition between the right and left-hand side.

Figure 21:
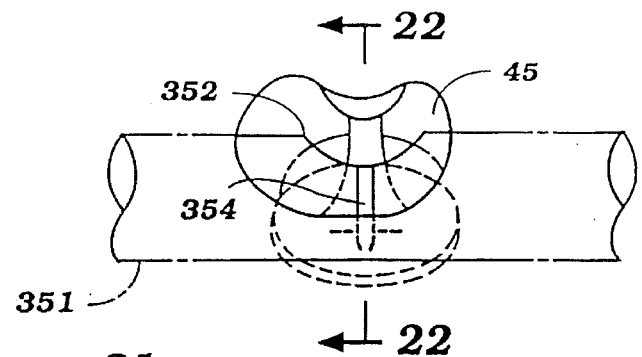
FIG. 21 is a view, in part similar to FIGS. 17, 19, and 20, and shows a yet further embodiment of the invention.
Figure 22:
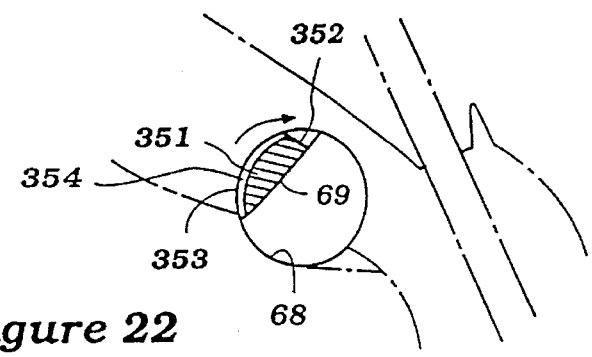
FIG. 22 is a cross-sectional view taken along the line 2—22 of FIG. 21.

In addition to changing the configuration of the cutout in the control valve, the control valve may also be provided with an arrangement that augments the flow and FIGS. 21 and 22 show such an embodiment wherein the control valve is identified generally by the reference numeral 351. The control valve 351 is provided with a configured cutout 352 in addition to the cutout 69 and which is disposed in this embodiment generally in line with the stem of the intake valve. However, the peripheral surface, indicated generally by the reference numeral 253 of the control valve is provided with a slotted passageway 354 which when the control valve is in its tumble inducing position as shown in FIGS. 21 and 22 cooperates with a recessed area formed by the bore 68 so that air may be drawn by a venturi-like action in the direction of the arrow shown in FIG. 22 so as to further augment the flow through the recess 352 and increase its velocity.

Figure 23:
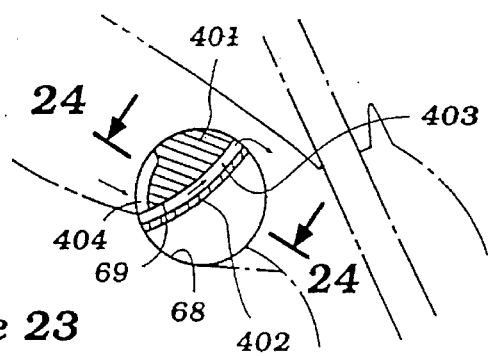
FIG. 23 is a cross-sectional view, in part similar to FIG. 22, and shows yet another embodiment of the invention.
Figure 24:
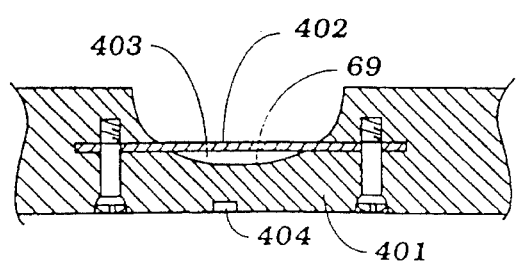
FIG. 24 is a cross-sectional view taken along the line 4—24 of FIG. 23.

FIGS. 23 and 24 show another embodiment of control valve, indicated generally by the reference numeral 401 embodying a further tumble augmentation method. The valve 401, like those of the previously described embodiments has a cutout portion 69. However, in this embodiment, the cutout portion 69 has a baffle plate 402 affixed across it which will form a flow channel 403. When the valve 401 is in its tumble inducing position, a ram air charge may be delivered to the flow channel 403 through a slot 404 formed in the face of the valve element 401 which is uncovered when the valve 401 is turned to its tumble inducing position. When this occurs, a flow can be induced as shown by the arrow so as to augment the tumble action. This slot and arrangement can be appropriately located transversely on the control valve 401 so as to be concentrated on one or the other side of the intake passage 45.

It should be readily apparent from the foregoing description that the described embodiments of the invention can provide very effective induction system control for engines having only a single intake valve per cylinder. In addition, the tumble action which is generated by the control valve can be configured and augmented so as to improve stratification as well as inducing turbulence through tumble action. Of course, the foregoing description is that of preferred embodiments of the invention and various changes and modifications may be made without departing from the spirit and scope of the invention, as defined by the appended claims.

We claim:

1. A cylinder head for use with a cylinder block having a cylinder bore closed by said cylinder head, said cylinder head having a surface cooperative with said cylinder bore and a piston reciprocating therein to form a combustion chamber, no more than single valve seat formed in said cylinder head surface at the termination of an intake passage for delivering an intake charge to said combustion chamber, and a control valve positioned in said intake passage and movable between an open position wherein the charge follows into said combustion chamber without substantial restriction and a closed position wherein the flow from said intake passage flows into said combustion chamber through said valve seat in a tumble motion rotating about an axis that extends transversely to the axis of said cylinder bore, said intake passage being inclined at an angle to a plane containing the axis of said cylinder bore so that the flow through said valve seat is inclined at an angle to said plane, a poppet type intake valve supported for reciprocation by said cylinder head and cooperating with said valve seat for controlling the flow therethrough, said control valve directing the flow through a side of said valve seat disposed adjacent said plane and away from the side of said valve seat spaced from said plane, said intake passage being disposed relative to said valve seat so that the flow through said valve seat is inclined at an angle also to a second plane perpendicular to said first plane and also containing said cylinder bore access.

2. The cylinder head as set forth in claim 1, wherein the center of the valve seat is offset relative to the perpendicular plane.

3. The cylinder head as set forth in claim 1, wherein the combustion chamber is formed with a squish area disposed on one side of a plane perpendicular to the first mentioned plane and containing the cylinder bore axis.

4. The cylinder head as set forth in claim 1, further including a poppet type intake valve supported for reciprocation by the cylinder head and cooperating with the valve seat for controlling the flow therethrough.

5. The cylinder head as set forth in claim 4, wherein the control valve directs the flow through a side of the valve seat disposed adjacent the first plane and away from the side of the valve seat spaced from said first plane.

6. The cylinder head as set forth in claim 1, further including a spark plug mounted in the cylinder head and having its gap disposed in the combustion chamber.

7. The cylinder head as set forth in claim 6, wherein the flow axis of the intake passage is directed toward the spark gap.

8. The cylinder head as set forth in claim 6, wherein the flow axis of the intake passage is directed away from the spark gap.

9. The cylinder head as set forth in claim 1, wherein the valve seat has its center disposed substantially on the perpendicular plane.

10. The cylinder head as set forth in claim 9, further including a popper type intake valve supported for reciprocation by the cylinder head and cooperating with the valve seat for controlling the flow therethrough.

11. The cylinder head as set forth in claim 10, wherein the control valve directs the flow through a side of the valve seat disposed adjacent the first plane and away from the side of the valve seat spaced from the first plane.

12. The cylinder head as set forth in claim 11, wherein the intake passage is disposed eccentrically to the valve stem of the poppet type intake valve so that the intake passage has a greater flow area on one side of said stem than on the other side of said stem.

13. The cylinder head as set forth in claim 12, further including a fuel injector for spraying fuel into the intake passage.

14. The cylinder head as set forth in claim 13, wherein the fuel injector is offset to one side of the induction passage.

15. The cylinder head as set forth in claim 14, wherein the fuel injector is offset toward the side closest to the cylinder bore axis.

16. A cylinder head for use with a cylinder block having a cylinder bore closed by said cylinder head, said cylinder head having a surface cooperative with said cylinder bore and a piston reciprocating therein to form a combustion chamber, a single valve seat formed in said cylinder head surface at the termination of an intake passage for delivering an intake charge to said combustion chamber, and a control valve positioned in said intake passage and movable between an open position wherein the charge flows in said combustion chamber without substantial restriction and a closed position wherein the flow from said intake passage flows into said combustion chamber through said valve seat in a tumble motion rotating about an axis that extends transversely to the axis of said cylinder bore, said intake passage being inclined at an angle to a plane containing the axis of said cylinder bore so that the flow through said valve seat is at an angle to said plane, a poppet type intake valve supported for reciprocation by said cylinder head and cooperating with said valve seat for controlling the flow therethrough, said control valve directing the flow through a side of said valve seat disposed adjacent said plane and away from the side of said valve seat spaced from said plane, said intake passage being disposed eccentrically to the valve stem of said poppet type intake valve so that said intake passage has a greater flow area on one side of said stem than on the other side of said stem.

17. The cylinder head as set forth in claim 16, wherein the flow through the valve seat is disposed at an angle also to a plane perpendicular to the first mentioned plane and also containing the cylinder bore axis.

18. A cylinder head for use with a cylinder block having a cylinder bore closed by said cylinder head, said cylinder head having a surface cooperative with said cylinder bore and a piston reciprocating therein to form a combustion chamber, a single valve seat formed in said cylinder head surface at the termination of an intake passage for delivering an intake charge to said combustion chamber, and a control valve positioned in said intake passage and movable between an open position wherein the charge flows into said combustion chamber without substantial restriction and a closed position wherein the flow from said intake passage flows into said combustion chamber through said valve seat in a tumble motion rotating about an axis that extends transversely to the axis of said cylinder bore, said intake passage being inclined at an angle to a plane containing the axis of said cylinder bore so that the flow through said valve seat is inclined at an angle to said first plane, said intake passage having its center disposed eccentrically to said valve seat so that there is a greater flow area in said intake passage on one side of said valve seat than on the other side of the valve seat.

19. The cylinder head as set forth in claim 18, wherein the flow through the valve seat is disposed at an angle also to a plane perpendicular to the first mentioned plane and also containing the cylinder bore axis.

20. The cylinder head as set forth in claim 19, wherein the perpendicular plane passes through the center of the valve seat and the larger area side of the intake passage is disposed on one side of the perpendicular plane.

21. The cylinder head as set forth in claim 20, wherein the one side of the perpendicular plane is the side from which the center of the intake passage diverges.

22. The cylinder head as set forth in claim 19, wherein the valve seat is disposed substantially on one side of the perpendicular plane.

23. The cylinder head as set forth in claim 19, further including a spark plug contained within the cylinder head and lying on one side of the perpendicular plane.

24. The cylinder head as set forth in claim 23, wherein the spark plug lies on the side of the perpendicular plane where the greater flow area of the intake passage relative to the valve seat is disposed.

25. The cylinder head as set forth in claim 23, wherein the spark plug is disposed on the side of the perpendicular plane toward which the center of the intake passage is directed.

26. The cylinder head as set forth in claim 21, further including a fuel injector spraying into the intake passage.

27. The cylinder head as set froth in claim 26, wherein the fuel injector is offset to one side of the intake passage.

28. The cylinder head as set forth in claim 27, wherein the fuel injector is offset so as to spray into the induction passage toward the side of the valve seat where the greatest area of the intake passage lies.

29. A cylinder head for use with a cylinder block having a cylinder bore closed by said cylinder head, said cylinder head having a surface cooperative with said cylinder bore and a piston reciprocating therein to form a combustion chamber, a single valve seat formed in said cylinder head surface at the termination of an intake passage for delivering an intake charge to said combustion chamber, and a control valve positioned in said intake passage and movable between an open position wherein the charge flows into said combustion chamber without substantial restriction and a closed position wherein the flow from said intake passage flows into said combustion chamber through said valve seat in a tumble motion rotating about an axis that extends transversely to the axis of said cylinder bore, a poppet type intake valve supported for reciprocation by said cylinder head and cooperating with said valve seat for controlling the flow therethrough, said intake passage being disposed eccentrically to the valve stem of said popper type intake valve so that said intake passage has a greater flow area on one side of said stem than on the other side of said stem.

30. The cylinder head as set forth in claim 29, wherein the control valve directs the flow through a side of the valve seat disposed adjacent the plane and away from the side of the valve seat spaced from the plane.

31. The cylinder head as set forth in claim 30, wherein the valve seat has its center disposed substantially on a further plane perpendicular to the first plane and also containing the cylinder bore axis.

32. The cylinder head as set forth in claim 31, further including a fuel injector for spraying fuel into the intake passage.

33. The cylinder head as set forth in claim 32, wherein the fuel injector is offset to one side of the induction passage.

34. The cylinder head as set forth in claim 33, wherein the fuel injector is offset toward the side of the intake passage having the smaller flow area.

35. The cylinder head as set forth in claim 30, wherein the center of the valve seat is offset relative to a further plane perpendicular to the first plane and also containing the cylinder bore axis.

36. The cylinder head as set forth in claim 30, further including a spark plug mounted in the cylinder head and having its gap disposed in the combustion chamber.

37. The cylinder head as set forth in claim 31, wherein the larger flow area side of the intake passage is disposed on one side of the perpendicular plane.

38. The cylinder head as set forth in claim 35, wherein the valve seat is disposed substantially on one side of the perpendicular plane.

39. The cylinder head as set forth in claim 31, further including a spark plug contained within the cylinder head and lying on one side of the perpendicular plane.

40. The cylinder head as set forth in claim 39, wherein the spark plug lies on the side of the perpendicular plane where the greater flow area of the intake passage relative to the valve seat is disposed.

41. The cylinder head as set forth in claim 29, wherein the combustion chamber is formed with a squish area disposed on one side of a plane perpendicular to the first mentioned plane and containing the cylinder bore axis.

* * * * *